United States Patent [19]

Specktor et al.

[11] Patent Number: 4,953,278
[45] Date of Patent: Sep. 4, 1990

[54] METHOD FOR ADJUSTING ALIGNMENT OF A WHEEL

[75] Inventors: Gerald A. Specktor, St. Paul; John Specktor, Golden Valley, both of Minn.

[73] Assignee: Shim-A-Line, Inc., Minneapolis, Minn.

[21] Appl. No.: 300,026

[22] Filed: Jan. 19, 1989

Related U.S. Application Data

[62] Division of Ser. No. 83,564, Aug. 7, 1987.

[51] Int. Cl.⁵ .............................................. B23P 19/04
[52] U.S. Cl. ............................... 29/402.06; 29/402.09; 29/402.11
[58] Field of Search ............ 29/402.03, 402.04, 402.06, 29/402.09, 402.11; 33/600; 72/704; 280/661

[56] References Cited

U.S. PATENT DOCUMENTS

| | | | |
|---|---|---|---|
| 2,890,893 | 6/1959 | Laukhuff | 280/661 |
| 4,194,760 | 3/1980 | Shiomi et al. | 280/661 |
| 4,281,443 | 8/1981 | Threlfall | 29/271 |
| 4,313,617 | 2/1982 | Muramatsu et al. | 280/661 |
| 4,466,635 | 8/1984 | Okada et al. | 280/661 |

Primary Examiner—Timothy V. Eley
Attorney, Agent, or Firm—Kinney & Lange

[57] ABSTRACT

A device is used to adjust caster of a wheel in a suspension system that includes a rod member that affects the caster of the wheel. A portion of the rod member is disposed within a bushing that is attached to the vehicle. The device includes a curved longitudinal member for insertion between the portion of the rod member disposed within the bushing and the bushing.

13 Claims, 6 Drawing Sheets

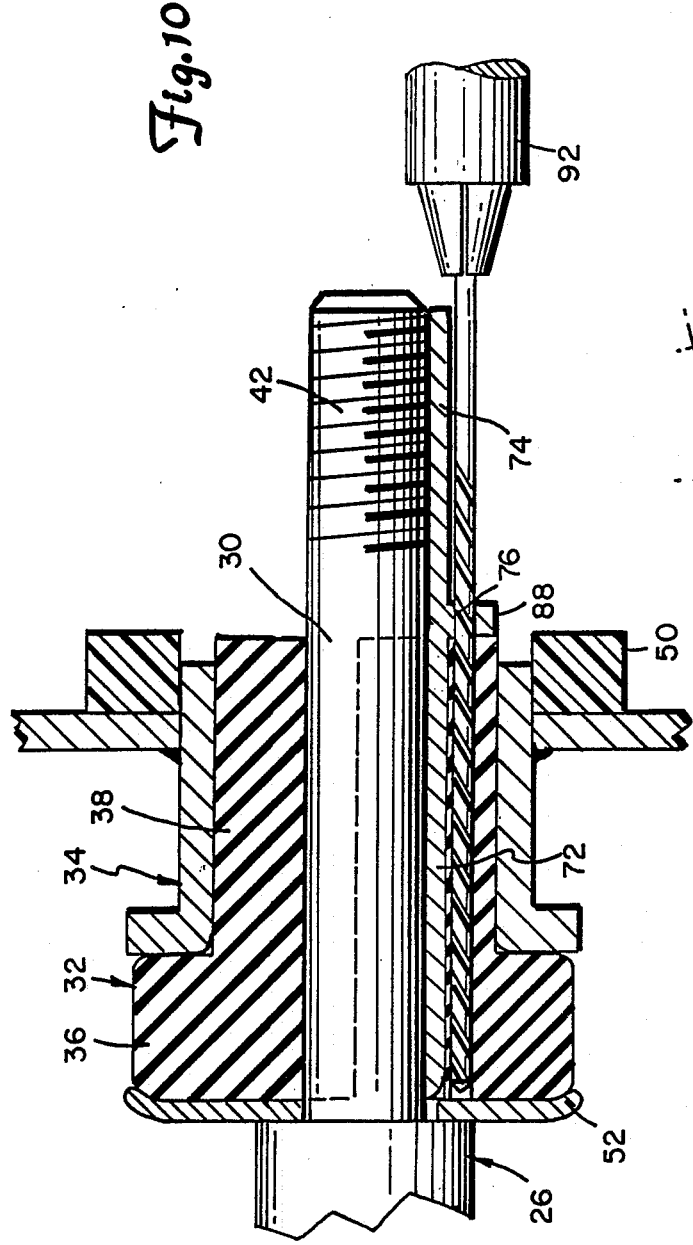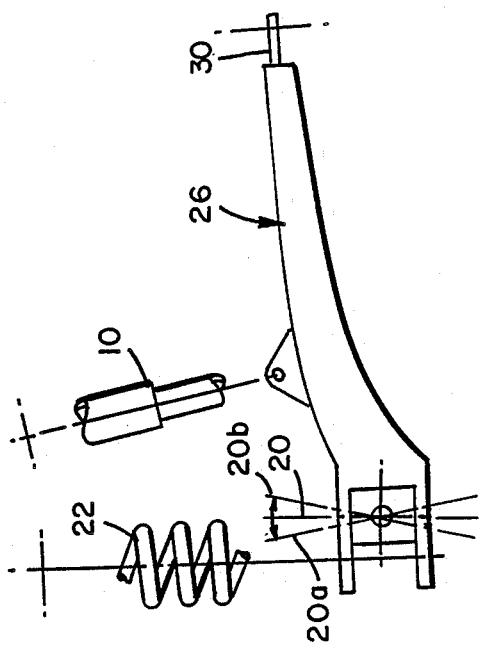

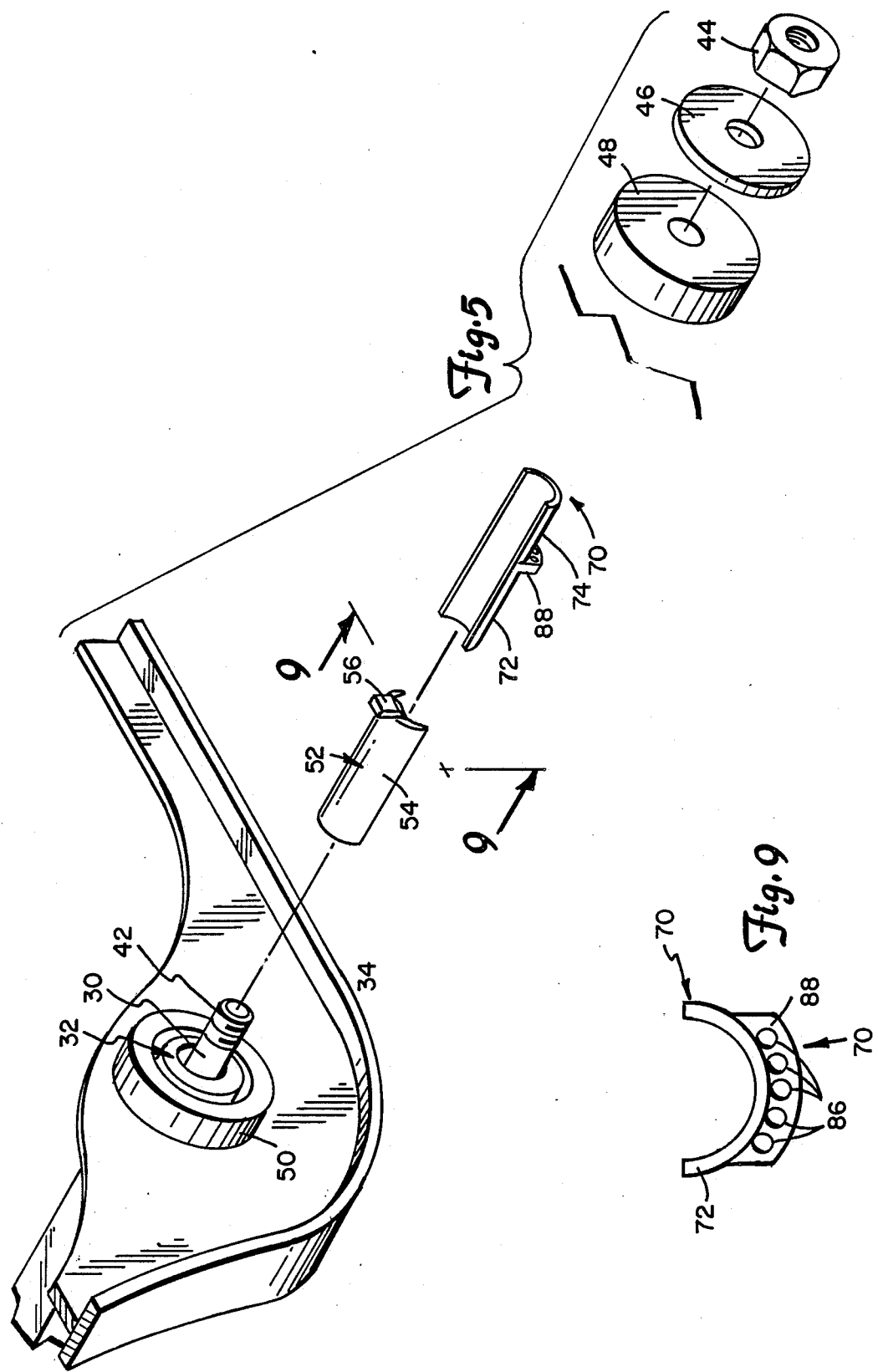

METHOD FOR ADJUSTING ALIGNMENT OF A WHEEL

This is a division of application Ser. No. 083,564, filed Aug. 7, 1987.

BACKGROUND OF THE INVENTION

1. Field of the Invention.

The present invention relates to devices for adjusting caster of a vehicle wheel, and in particular, it relates to a device that adjusts the caster in a suspension system having a rod member that affects caster with the rod member having a portion disposed in a bushing attached to the vehicle.

2. Description of the Prior Art.

Certain suspension systems, such as are used in a Ford pick-up with a twin I-beam frame construction, have a radius arm that extends from an I-beam rearwardly to a radius arm bushing that is attached to a vehicle frame member. Both left and right front suspension systems contain such a radius arm. The radius arm bushing is typically made of a hard rubber. At first, the bushing fits snugly and holds the radius arm in the position selected by the manufacturer of the automobile. However, due to the action of the end of the radius arm against the bushing over a period of time along with the coil spring settling, a small amount of play develops in the end of the arm, which results in the caster of the wheel and handling of the vehicle being affected.

Other vehicles with stabilizer bars that are held with bushings have similar correction problems. The prior art method of correcting this play is to replace the bushing. This requires a good deal of labor since the radius arm has to be disconnected and removed from the bushing and the bushing replaced.

SUMMARY OF THE INVENTION

The present invention includes a method and a device for correcting caster of a vehicle suspension system having a rod member that affects the caster of the wheel with a portion of the rod member being disposed within a bushing attached to the vehicle. The device includes a curved longitudinal member for insertion between the portion of the rod member disposed within the bushing and the bushing.

In one case, where the rod member is a radius arm, the device is inserted between an end of the radius arm within the bushing and the bushing. In another case, where the rod member is a stabilizer bar having a portion retained within the bushing, the device is inserted between the stabilizer bar and the bushing.

The method of the present invention in the case of the radius arm includes removing the nut, washer and insulation, retaining the end of the radius arm within the bushing, and inserting between the end of the radius arm and the bushing, a longitudinal main body portion being curved along a longitudinal axis, either above the end of the radius arm or below the end of the radius arm to adjust the caster of the vehicle wheel. The insulator, washer and nut are attached back to the radius arm.

The method of the present invention in the case of a stabilizer bar is to remove a stabilizer bar bracket that retains the bushing against the stabilizer bar body bracket and insert the device of the present invention either in front of or rearward of the stabilizer bar to correct caster in the manner desired. The stabilizer bar bracket is then reattached to the stabilizer bar body bracket.

BRIEF DESCRIPTION OF THE DRAWINGS

FIG. 4 is a diagrammatical view of a radius arm illustrating how caster is changed using the present invention.

FIG. 5 is an exploded perspective view illustrating how the device of the present invention is inserted between an end portion of the radius arm and the radius arm bushing using a tool of the present invention.

FIG. 9 is an end view of the tool of the present invention.

FIG. 10 is a cross-sectional view of the tool of the present invention, the bushing with an end portion of the radius arm and a drill bit shown whole illustrating how the guide holes of the tool are used.

DETAILED DESCRIPTION OF THE PREFERRED EMBODIMENTS

Figure 1:
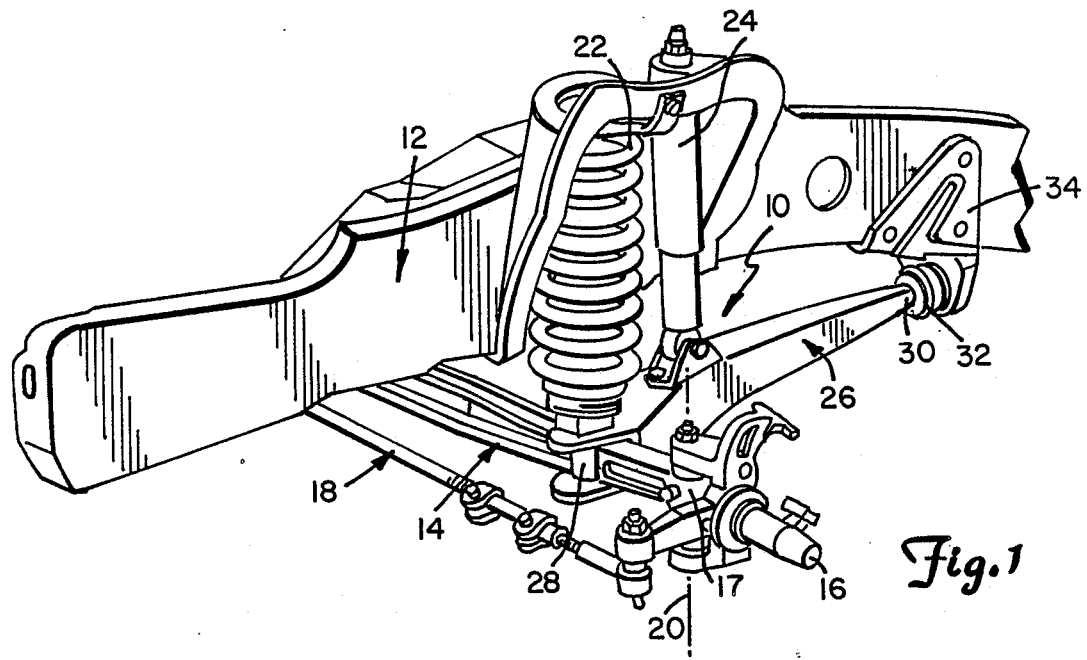
FIG. 1 is a perspective view of an example of a suspension system in which the device of the present invention is used.

The present invention is used to adjust caster of a vehicle wheel in a suspension system such as is generally indicated by 10 in FIG. 1. Only the left front wheel suspension system is shown with it being understood that a right front wheel suspension system is a mirror image of the left suspension system illustrated in FIG. 1. The suspension system 10 is connected to a frame member 12 of a vehicle (not shown). The suspension system 10 includes an I-beam cross member 14. An axle 16 to which a vehicle wheel (not shown) is rotatably attached thereto is pivotally connected to the cross member 14 by a steering knuckle 17 having an axis 20. A steering system 18 through a series of tie rods pivots the axle about axis 20 through steering knuckle 17.

The cross member 14 is suspended from the frame member 12 by a coil spring 22 and shock absorber 24. A radius arm 26 also holds the cross member 14 at one end portion 28 and is attached to the frame member 12 at another end portion 30.

Figure 2:
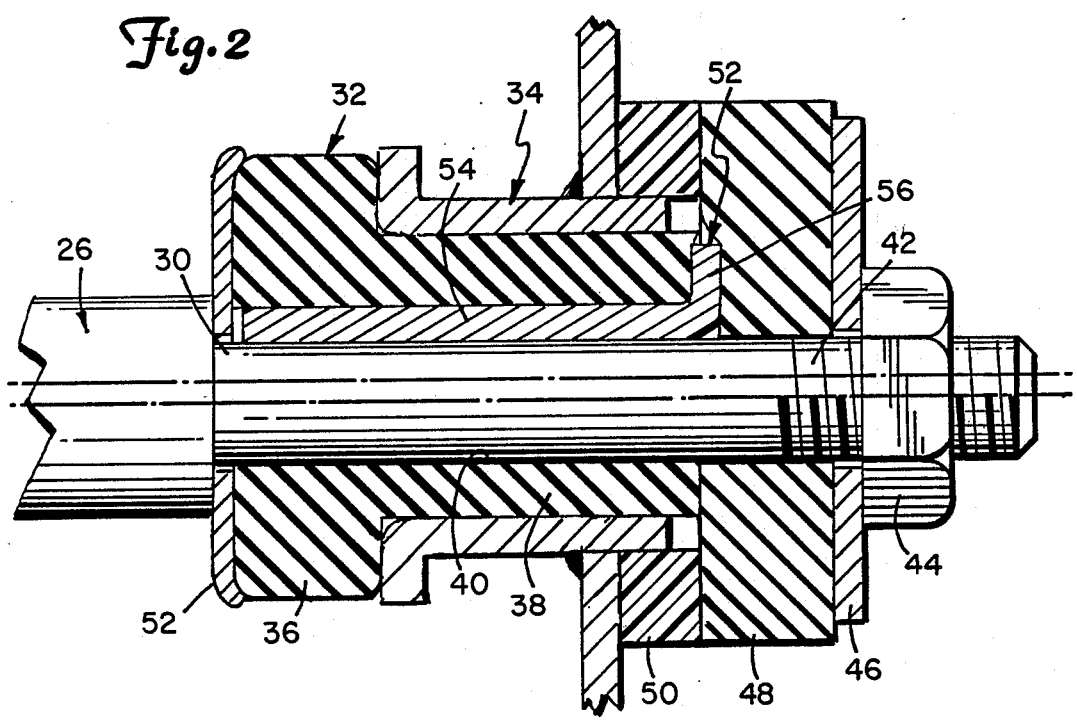
FIG. 2 is a cross-sectional view of the device of the present invention, the radius arm bushing and an end portion of the radius arm.

The radius arm 26 is connected at the end portion 30 to the frame member 12 through a radius arm bushing 32 disposed in an arm bushing housing 34 that is securely welded or riveted to the frame member 12. Referring to FIG. 2, the bushing 32 typically has a greater diameter forward section 36 and a smaller diameter rearward section 38 that is disposed within the bushing housing 34. The bushing contains an inner bore 40 through which the radius arm end portion extends. The radius arm end portion has a threaded end section 42 that extends beyond the bushing 32. The radius arm is retained in position by a nut 44 engaging the threaded end section 42. A washer 46 and an insulator 48 are disposed between the nut and the bushing. A spacer 50 is also disposed between the insulator 48 and the bushing housing 34. A retainer 53 is positioned adjacent a front end of the bushing section 36. The bushing 32 is made of a hard rubber for securely attaching the radius arm to the frame member while dampening any shocks that may be transmitted from the wheels to the body of the vehicle.

Since the radius arm end portion 30 is riding within the bushing 32, the bushing 32 will wear over a period of time resulting in a certain amount of play developing. One primary cause for bushing wear is that the spring 22 sags over an extended period of time. The sagging of spring 22 causes accelerating wear in the bushing. The play caused by the sagging spring through the worn bushing 32 results in a deviation in caster. Caster is the angle, as measured in degrees, that the steering knuckle axis is inclined from the vertical toward the front or rear of the vehicle. A small degree of positive caster improves directional stability and increases resistance to crosswinds or road surface deviation.

Figure 3:
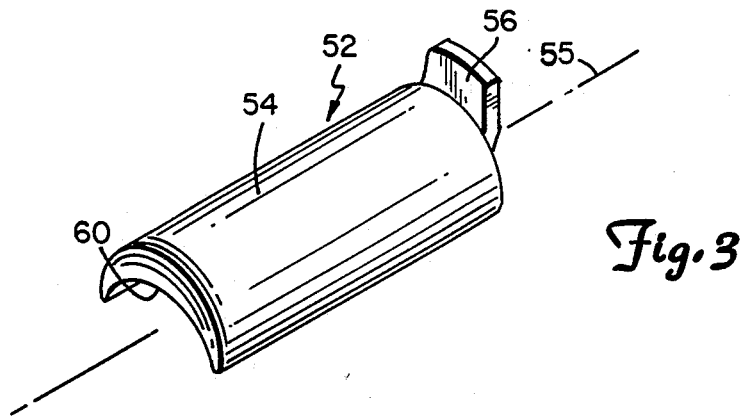
FIG. 3 is a perspective view of the device of the present invention.

The device of the present invention, illustrated in FIG. 3, eliminates the play developed between the radius arm end portion 30 and the bushing 32 and adjusts the caster angle. As illustrated in FIG. 4, the axis 20 of the steering knuckle is 0° caster. Inclining the steering knuckle axis toward the front of the vehicle to line 20a provides a negative caster angle. Inclining the steering knuckle axis toward the rear of the vehicle provides a positive caster angle as identified by reference character 20b.

The device 52 of the present invention includes a longitudinal main body portion 54 being curved about a longitudinal axis 55. The main body portion 54 is generally arcuate in cross section. A lip 56 is attached at one end and extends generally perpendicular to the longitudinal axis 55. The main body portion 54 of the device 52 has an inwardly curved surface area 60 that generally conforms to the outer curvature of the end portion 30 of the radius arm.

As illustrated in FIG. 2, the device 52 of the present invention adjusts caster without having to disconnect the radius arm from the bushing. The device 52 also eliminates any play that has developed due to wear of the bushing 32 from contact between the bore 40 surfaces and the end portion 30 of the radius arm.

As best illustrated in FIG. 5, the nut 44 is threadably disengaged from the threaded end 42 of the end portion 30 of the radius arm. The washer 46 and insulator 48 are also removed from the end portion 30. The device 52 is then inserted on an upper or a lower surface, depending on the caster adjustment required of the end portion 30. Positioning the device below the end portion 30 moves the steering knuckle axis rearward or to the position 20a of FIG. 4. Positioning the device on a top surface of the end portion 30 moves the steering knuckle axis to the position 20b of FIG. 4. The lip 56 acts as a stop and retaining means for retaining the main body portion 54 in a selected position. In addition, the lip 56 may be used to facilitate removal of the device 52, if needed.

Figure 6:
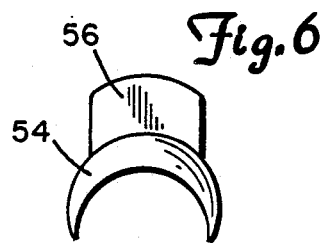
FIGS. 6, 7 and 8 are end views illustrating the different thicknesses of the device of the present invention.
Figure 6A:
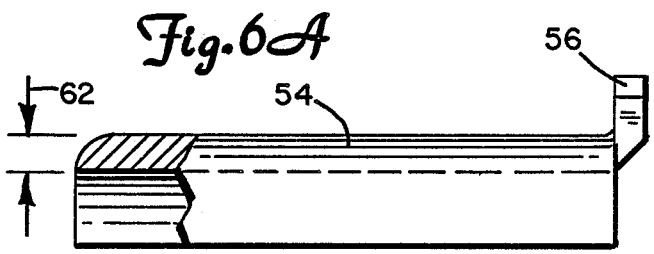
FIGS. 6a, 7a and 8a are front views showing different thicknesses of the device of the present invention.
Figure 7:
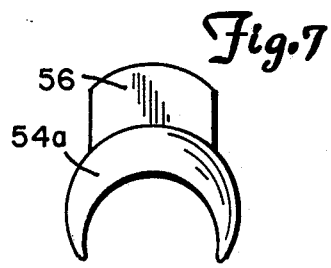
Figure 7A:
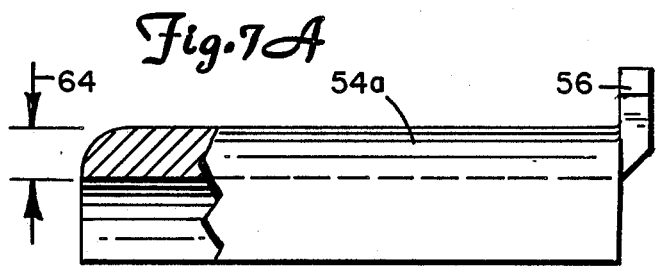
Figure 8:
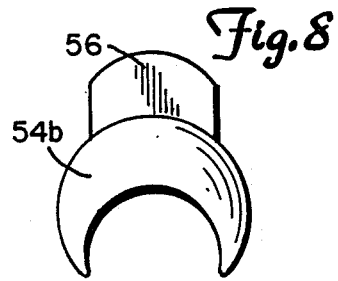
Figure 8A:
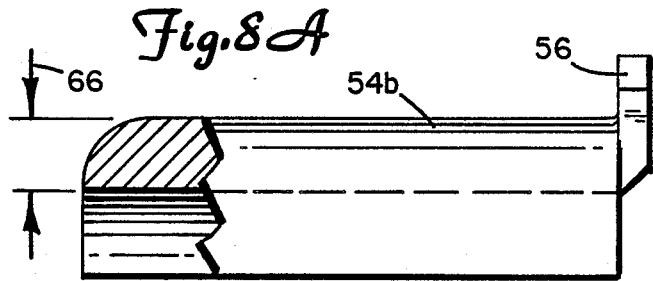

As illustrated in FIGS. 6, 7 and 8 (and also FIGS. 6a, 7a and 8a), the thickness of the longitudinal body 54, as depicted by arrows 62, 64 and 66 in FIGS. 6a, 7a and 8a, all respectively, can be varied. Varying the thickness of the longitudinal body 54 will vary the distance that the end of the radius arm is moved thereby varying the amount that the caster can be adjusted. The device 52 of the present invention is preferably provided as a set of devices with different thicknesses so that a device with the proper thickness is inserted to adjust the caster the desired degree.

To facilitate insertion of the device 52 of the present invention, a tool 70, as illustrated in FIGS. 5 and 9 is provided. The tool 70 includes a front portion 72 and a rear portion 74 separated by a flange portion 88. The front portion 72 and the rear portion 74 are interchangable. The front portion 72 is inserted between the bushing 32 and the end portion of the radius arm 30, as illustrated in FIG. 2, abutting the flange 88 against the bushing. Both the front portion 72 and the rear portion 74 have an inner curvature conforming to the outer surface curvature of the radius arm 30, and an outer surface curvature conforming to the curvature of the inner surface of the bushing bore.

The tool 70 is provided with a plurality of guide holes 86 disposed within the flange portion 88. If the space between the radius arm end portion 30 and the surface of the bore of the bushing 32 is not sufficient to accept a device 52 having a particular thickness, the guide holes 86 of the tool 70 are used to guide a drill bit 90 run by a drill 92 to remove amounts of rubber in the bushing. A series of holes are drilled on a diametrically opposite side from the point of insertion of the device 52 which permits the drilled bushing section to be compressed so that the device 52 is insertable between the end portion 30 and the bushing 32, as illustrated in FIG. 10.

After the holes have been drilled in the bushing, the device 52 is inserted between the end portion 30 and the bushing 32. The lip 56 will prevent the device from being inserted further than is necessary.

After the device 52 is placed in position and the caster adjusted to the desired angle, the insulator 48 is placed against the spacer 50 and the washer 46 is placed against the insulator 48 and the nut 44 is threaded onto the threaded end section 42 of the radius arm.

Figure 11:
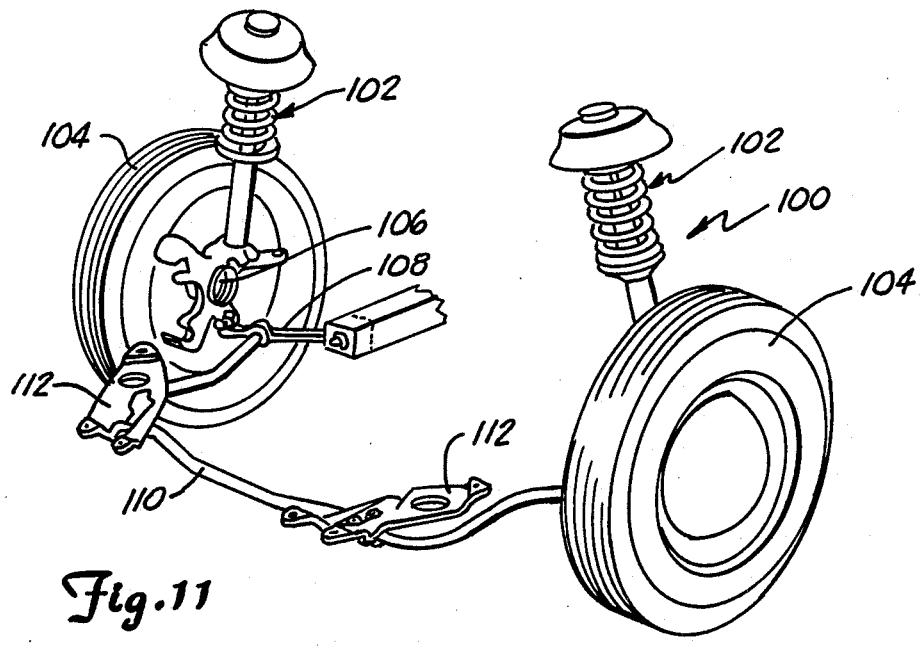
FIG. 11 is a perspective view of a suspension system having a portion of a stabilizer bar disposed within a bushing that is secured to the vehicle.

The device of the present invention is also useful in correcting caster where caster is affected by play developing between a stabilizer bar and bushing retaining the stabilizer bar and weakening of coil spring on strut. One such suspension is generally indicated at 100 in FIG. 11. The suspension system shown in FIG. 11 is a suspension system found in the Ford Escort. The suspension system includes a MacPherson strut 102 including coil spring 103 supporting each wheel on either side of the vehicle. The wheels are attached to steering knuckles 106 (only one being shown). The steering knuckle, in turn, is supported at one point by a control arm assembly 108 (only one being shown). The control arm assemblies are connected by a stabilizer bar 110 that is secured to the vehicle by stabilizer bar body brackets 112.

Figure 12:
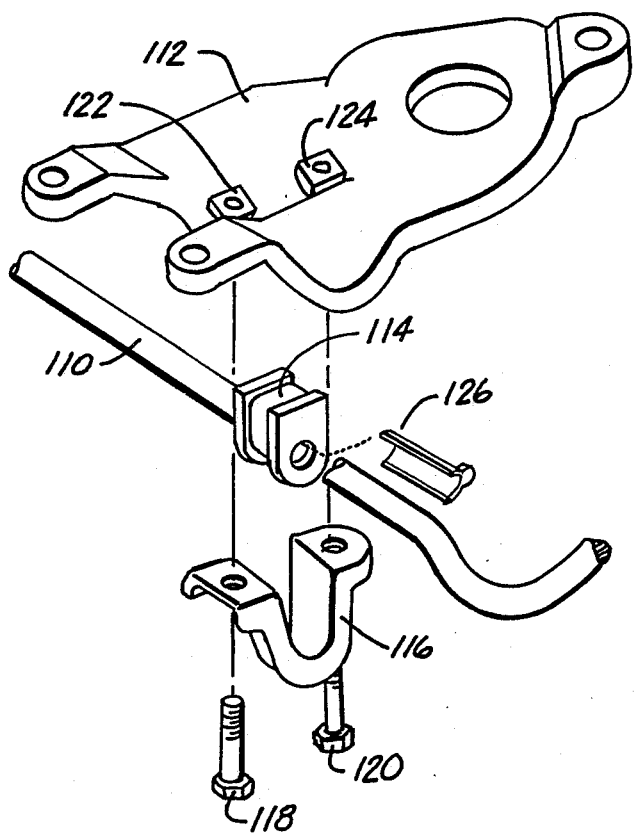
FIG. 12 is an exploded perspective view of the stabilizer bar, stabilizer bar bushing, stabilizer bar bracket and stabilizer bar body bracket and the device of the present invention.

Referring to FIG. 12, the stabilizer bar 110 extends through a stabilizer bar bushing 114. The stabilizer bar bushing 114 is held in place by a stabilizer bar bracket 116 that is attached to the stabilizer bar body bracket 112 by bolts 118 and 120 engaging nuts 122 and 124.

It will be appreciated that if play develops between the bushing 114 and the stabilizer bar 110, such that caster was affected, the bushing 114 had to be replaced. This required removing bracket 116, cutting the bushing 114 so that the bushing is removed from the stabilizer bar and installing a new bushing that is provided in two halves (hereinafter referred to as a split bushing). After the split bushing is put on a stabilizer bar, the bracket 116 is then reattached to the stabilizer bar body bracket 112 to hold the split bushing in place.

Using a device 126 of the present invention provides a simple method for eliminating the play between the stabilizer bar and the stabilizer bar bushing 114 and adjusting caster to a desired value.

The method of the present invention includes loosening bolts 118 and 120 enough so that the device 126 can be inserted between the bushing 114 and the stabilizer bar 110, either forward of the stabilizer bar 110 or rearward of the stabilizer bar 110. Placing the device 126 in front of the stabilizer bar 110 reduces caster. Placing the device 126 rearward of the stabilizer bar 110 increases caster.

After the device 126 is inserted in the desired position, the bolts 118 and 120 are retightened, attaching the stabilizer bar bracket 116 once again to the stabilizer bar body bracket 112.

Figure 13:
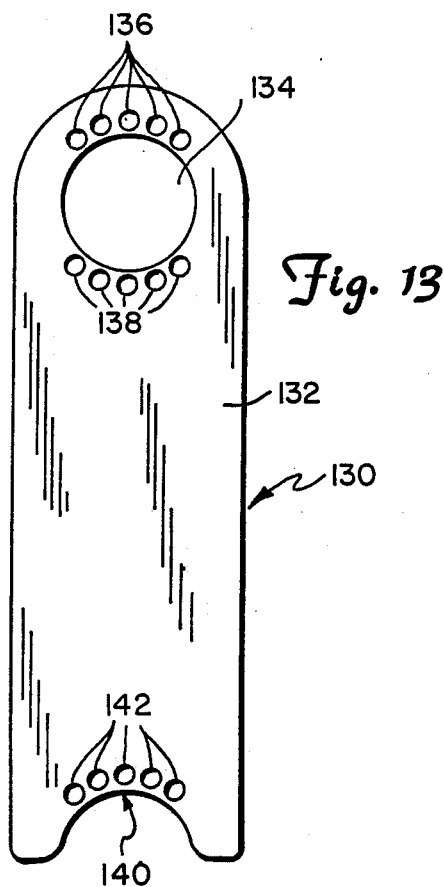
FIG. 13 is a plan view of an alternative embodiment of the tool of the present invention.

An alternative embodiment of the tool of the present invention is generally indicated at 130 in FIG. 13. The tool 130 is a relatively flat plate 132 having at one end an aperture 134 with a diameter sufficient to accept, for example, the end portion of the radius arm 30 which is typically a ⅞ inch diameter. On diametrically opposite sides of the aperture 134 are two sets of a series of ⅛ inch guide holes 136 and 138, respectively. The tool 130 is used in a similar manner to the tool 70 illustrated in FIGS. 5, 9 and 10. The end portion 30 of the radius arm is inserted into the aperture 134 and then either guide holes 136 or guide holes 138 may be used to drill the bushing 32 as needed.

On an opposite end of the tool 130 is located a curved slot 140 having a 7/16 inch radius with a plurality of ⅛ inch guide holes 142 located along the periphery of the slot 140. The slot 140 along with guide holes 142 is used to guide drilling holes in the bushing when the device of the present invention is used to adjust a stabilizer bar. The edge surface of the slot 140 is placed against the stabilizer bar along side the bushing, and the guide holes 142 are used to guide a drill bit to drill the bushing, in a similar manner as shown in FIG. 10. One end of the tool 130 is used as a handle while utilizing the other end to guide drilling holes in the bushing.

Figure 14:
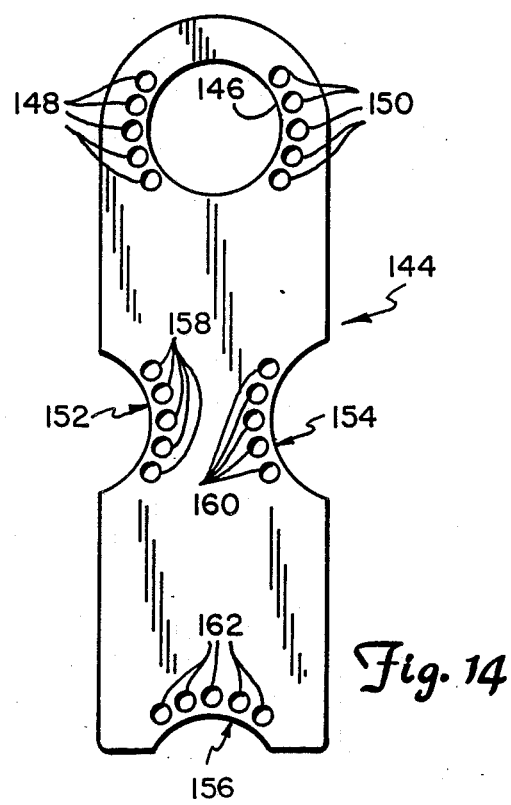
FIG. 14 is still another alternative embodiment of the tool of the present invention.

In still another alternative embodiment of the tool generally indicated at 144 in FIG. 14, the tool 144 is a flat plate that includes an aperture 146 similar to aperture 134 of the tool in FIG. 13. The aperture 146 includes two series of guide holes positioned on diametrically opposite sides of the aperture 146. In addition, the tool 144 includes a series of curved slots 152, 154 and 156. Each curved slot has a plurality of ⅛ inch guide holes associated therewith. The curved slot 152 has guide holes 158 disposed along the periphery of the slot. Similarly, the curved slot 154 has a plurality of guide holes 160 disposed along the periphery of the slot 154. The slot 156 also has a plurality of guide holes 162 associated therewith. The slots 152, 154 and 156 each have a different radius and are used for a stabilizer bars of different diameters, in the same manner that curved slot 140 is used of FIG. 13. In the working embodiment, the slot 152 will accept a bar of 1 inch diameter, the slot 154 will accept a bar of ⅞ inch diameter, and the slot 156 will accept a bar of 1½ inch diameter.

In summary, the present invention provides a solution for easily correcting caster in a vehicle wheel having either a radius arm or stabilizer bar retained within a bushing that can be worn. In addition, the present invention provides a method for correcting caster due to a worn bushing without having to disconnect the radius arm or the stabilizer bar.

Although the present invention has been described with reference to preferred embodiments, workers skilled in the art will recognize that changes may be made in form and detail without departing from the spirit and scope of the invention.

What is claimed is:

1. A method for adjusting alignment of a wheel attached to a vehicle having a rod member affecting the alignment, the rod member having a portion disposed within a bushing, the rod member and the bushing being adjacent, the method comprising:
   inserting between the rod member and the bushing a shim along one side of the rod member to adjust the alignment of the wheel.

2. The method of claim 1 wherein the shim is configured to conform to an outer surface of the rod member.

3. The method of claim 1 and wherein the rod member is a radius arm and further including the steps of:
   disengaging a nut from an end of the radius arm disposed within the bushing prior to insertion of the shim; and
   placing the nut back on the end of the radius arm after the shim is inserted between the radius arm and the bushing.

4. The method of claim 3 and further including the step of:
   removing washers and insulators disposed between the nut and the bushing prior to inserting the shim between the radius arm and the bushing and placing back any washers or insulators between the nut and the bushing after the shim has been inserted.

5. The method of claim 1 wherein the shim has an arcuate cross section.

6. The method of claim 5 wherein the shim includes a stop means such that the shim is inserted between the bushing and the rod member a selected distance.

7. The method of claim 1 wherein the bushing is a rubber bushing, and wherein the method further includes removing a portion of the bushing on a slide of the rod member opposite the shim.

8. The method of claim 7 wherein removing a portion of the bushing includes drilling at least one hole in the bushing.

9. A method for adjusting alignment of a wheel attached to a vehicle having a stabilizer bar that affects alignment, the stabilizer bar having a portion disposed within a bushing, the method comprising:
   inserting between the stabilizer bar and the bushing a shim along one side of the stabilizer bar to adjust the alignment of the wheel.

10. The method of claim 9 wherein the bushing is a rubber bushing, and wherein the method further includes removing a portion of the bushing on a side of a rod member opposite the shim.

11. The method of claim 10 wherein removing a portion of the bushing includes drilling at least one hole in the bushing.

12. The method of claim 9 wherein the shim has an arcuate cross section.

13. The method of claim 12 wherein the shim includes stop means such that the shim is inserted between the bushing and a rob member to a selected distance.

* * * * *

UNITED STATES PATENT AND TRADEMARK OFFICE
CERTIFICATE OF CORRECTION

PATENT NO. : 4,953,278

DATED : September 4, 1990

INVENTOR(S) : Gerald A. Specktor et al.

It is certified that error appears in the above-identified patent and that said Letters Patent is hereby corrected as shown below:

ON THE TITLE PAGE:

Item [56]: In the References Cited Section, under U.S. PATENT DOCUMENTS, insert the following:

4,660,908    4/1987    Ballester . . . . 339/14R

Col. 6, line 39, after "includes", delete "a".

Col. 6, line 41, delete "the", insert --a--.

Col. 6, line 41, after "member", insert --to--.

Col. 6, line 44, delete "slide", insert --side--.

Col. 6, line 67, delete "rob", insert --rod--.

Signed and Sealed this

Fourteenth Day of January, 1992

Attest:

HARRY F. MANBECK, JR.

*Attesting Officer*      *Commissioner of Patents and Trademarks*